United States Patent
Al-Ajmi et al.

(10) Patent No.: US 10,597,988 B2
(45) Date of Patent: Mar. 24, 2020

(54) SYSTEMS AND METHODS FOR OPERATING DOWNHOLE INFLOW CONTROL VALVES

(71) Applicant: Saudi Arabian Oil Company, Dhahran (SA)

(72) Inventors: Mohammed Dhafer Al-Ajmi, AlKhobar (SA); Nasser Mubarak Al-Hajri, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 371 days.

(21) Appl. No.: 15/823,870

(22) Filed: Nov. 28, 2017

(65) Prior Publication Data

US 2019/0162330 A1  May 30, 2019

(51) Int. Cl.
| | | |
|---|---|---|
| *E21B 43/12* | (2006.01) | |
| *F16K 37/00* | (2006.01) | |
| *E21B 34/10* | (2006.01) | |
| *E21B 47/00* | (2012.01) | |
| *E21B 34/14* | (2006.01) | |
| *E21B 43/14* | (2006.01) | |
| *E21B 34/00* | (2006.01) | |

(52) U.S. Cl.
CPC .............. *E21B 43/12* (2013.01); *E21B 34/10* (2013.01); *E21B 34/14* (2013.01); *E21B 43/14* (2013.01); *E21B 47/00* (2013.01); *F16K 37/0041* (2013.01); *E21B 2034/007* (2013.01)

(58) Field of Classification Search
CPC .......... E21B 34/10; E21B 34/14; E21B 47/00; E21B 43/12; E21B 43/14; E21B 2034/007; F16K 37/0041
See application file for complete search history.

(56) References Cited

U.S. PATENT DOCUMENTS

| | | |
|---|---|---|
| 4,719,587 A | 1/1988 | Berte |
| 5,033,012 A | 7/1991 | Wohld |
| 6,928,391 B2 | 8/2005 | Fujiyama et al. |
| 7,082,384 B2 | 7/2006 | Sasaki et al. |

(Continued)

OTHER PUBLICATIONS

De Best et al., "Smart Fields-Making the Most of our Assets", Russian Oil and Gas Technical Conference, 2006, pp. 1-4, Society of Petroleum Engineers.

(Continued)

*Primary Examiner* — Robert E Fuller
*Assistant Examiner* — Christopher J Sebesta
(74) *Attorney, Agent, or Firm* — Bracewell LLP; Constance G. Rhebergen; Christopher L. Drymalla

(57) ABSTRACT

Provided are systems and method for operating and maintaining downhole inflow control valves (ICVs) of hydrocarbon wells, including monitoring the operations of ICVs to identify failure and non-failure times of defective and non-defective ICVs, respectively, determining a probability of failure of the ICVs ($P_f$) based on the failure and non-failure times, determining an operational stroking duration based on the probability of failure of the ICVs ($P_f$), and operating ICVs in accordance with the operational stroking duration determined.

19 Claims, 4 Drawing Sheets

(56) References Cited

U.S. PATENT DOCUMENTS

| | | | |
|---|---|---|---|
| 7,542,875 B2* | 6/2009 | Rogers | F04B 51/00 |
| | | | 417/63 |
| 7,739,089 B2* | 6/2010 | Gurpinar | E21B 43/00 |
| | | | 703/10 |
| 7,819,024 B1* | 10/2010 | Lucas | G01M 1/122 |
| | | | 73/862.041 |
| 8,056,390 B2 | 11/2011 | Filkovski et al. | |
| 8,423,397 B2 | 4/2013 | Sitton | |
| 8,442,853 B2 | 5/2013 | Abbott | |
| 2009/0083089 A1* | 3/2009 | Conchieri | G06Q 10/00 |
| | | | 705/7.41 |
| 2011/0011581 A1* | 1/2011 | Stephenson | E21B 43/00 |
| | | | 166/250.01 |

OTHER PUBLICATIONS

Ibeh et al., "The Agbami Digital Oilfield Solution and Reliability Assessment of Intelligent Well Completions", Offshore Technology Conference, 2015, pp. 1-33, OTC.

International Search Report and Written Opinion for International PCT application PCT/US2018/062529 dated Feb. 20, 2019; pp. 1-14.

Mathieson et al., "Reliability assurance, managing the growth of Intelligent Completion technology", SPE Annual Technical Conference, 2003, pp. 1-8, Society of Petroleum Engineers.

\* cited by examiner

SYSTEMS AND METHODS FOR OPERATING DOWNHOLE INFLOW CONTROL VALVES

FIELD

Embodiments relate generally to developing wells, and more particularly to operating and maintaining downhole inflow control valves of hydrocarbon wells.

BACKGROUND

A well generally includes a wellbore (or "borehole") that is drilled into the earth to provide access to a subsurface formation (a geographic formation below the earth's surface) to facilitate the extraction of natural resources, such as hydrocarbons and water from the subsurface formation, to facilitate the injection of fluids into the subsurface formation, or to facilitate the evaluation and monitoring of the subsurface formation. In the petroleum industry, wells are often drilled to extract (or "produce") hydrocarbons, such as oil and gas, from subsurface formations. The term "oil well" is used to refer to a well designed to produce oil. In the case of an oil well, some natural gas is typically produced along with oil. A well producing both oil and natural gas is sometimes referred to as an "oil and gas well" or "oil well."

Creating an oil well typically involves several stages, including a drilling stage, a completion stage and a production stage. The drilling stage normally involves drilling a wellbore into a subsurface formation that is expected to contain a concentration of hydrocarbons that can be produced. The portion of the subsurface formation expected to contain hydrocarbons is often referred to as a "hydrocarbon reservoir" or "reservoir." The drilling process is usually facilitated by a drilling rig that sits at the earth's surface. The drilling rig provides for operating a drill bit to cut the wellbore, hoisting, lowering and turning drill pipe and tools, circulating drilling fluids in the wellbore, and generally controlling various operations in the wellbore (often referred to as "down-hole" operations). The completion stage involves making the well ready to produce hydrocarbons. In some instances, the completion stage includes installing casing pipe into the wellbore, cementing the casing in place, perforating the casing pipe and cement, installing production tubing, installing downhole valves for regulating production flow, and pumping fluids into the well to fracture, clean or otherwise prepare the reservoir and well to produce hydrocarbons. The production stage involves producing hydrocarbons from the reservoir by way of the well. During the production stage, the drilling rig is normally removed and replaced with a collection of valves at the surface, often referred to as a "production tree". The surface valves are operated in coordination with downhole valves to regulate pressure in the wellbore, control production flow from the wellbore and provides access to the wellbore in the event further completion work is needed. A pump jack or other mechanism can provide lift that assists in extracting hydrocarbons from the reservoir, especially in instances where the pressure in the well is so low that the hydrocarbons do not flow freely to the surface. Flow from an outlet valve of the production tree is normally connected to a distribution network of midstream facilities, such as tanks, pipelines and transport vehicles that transport the production to downstream facilities, such as refineries and export terminals.

Often times the downhole valves include inflow control valves (ICVs) installed in the wellbore to regulate the flow of substances in the wellbore. In particular, ICVs can be installed in the wellbore to regulate the flow of substances, such as oil, gas and water, between the subsurface formation and a production conduit, such as casing or production tubing that provides a flow path to the surface. In the case of a well being operated as a production well, for example, a completion unit may include one or more ICVs that regulate the inflow of production fluids from a reservoir, into a central passage of the casing or production tubing that directs the production fluids to the surface for collection.

The operational state of an ICV is typically controlled remotely, for example, by a well control system at the surface. ICVs can be controlled to actuate between a fully opened position and fully closed position. The fully opened position includes opening the entire flow area of the valve to facilitate the flow of substances, such as production fluids, across the ICV. The fully closed position closes the entire flow area of the valve to block the flow of substances across the ICV. Normally, an ICV has several partially opened positions that can be utilized to regulate flow through the ICV. For example, an ICV may have ten "steps", with step 0 being a 0% open position (referred to as a "fully closed" position), step 1 being a 10% open position, step 2 being a 20% open position, and so forth, with step 10 being a 100% open position (referred to as a "fully opened" position). The state of an ICV may be dictated by a variety of factors, such as desired flow rate and pressure, water cut (volume of produced water with respect to total fluid production), and flow contribution of other portions of the well.

SUMMARY

Applicants have recognized that installing and maintaining an inflow control valve (ICV) in a hydrocarbon well, such as an oil well, is a time consuming and costly process, often requiring the assistance of a rig, or other surface systems, to run, access or retrieve an ICV deep in a wellbore of the well. As such, maintaining a fully functional ICV throughout the lifecycle of a well is important to reduce the time and costs required to operate the well to help enhance the well's return on investment.

Applicants have recognized that it is not uncommon for an ICV to malfunction while installed in a wellbore of a hydrocarbon well, and that malfunctioning is more likely if the ICV is not periodically stroked. The process of stroking (or "cycling") an ICV can include operating the ICV between its fully opened and fully closed positions, iteratively moving though each of the ICV's available positions (or "steps") from fully closed to fully opened or vice versa. For example, stroking a hydraulically controlled ICV may include a surface control system applying hydraulic pressure to the ICV through hydraulic control lines, to iteratively actuate the ICV into each available step from the fully closed position to the fully opened position. The action of stroking an ICV helps to ensure the ICV's opening and mechanisms are free from obstructing materials, such as sand, sludge, or other debris, that would prevent the ICV from operating properly at each of the steps. Applicants have recognized that the presence of obstructing material in an ICV is a common cause of ICVs failing or otherwise malfunctioning, such as being stuck at a given step or not being able to move to a particular step. Unfortunately, when an ICV malfunctions, limited options are available, including the following: (1) undertaking a costly replacement operation to replace the ICV; (2) undertaking a costly functionality restoration operation in an attempt to repair the ICV (without a guarantee of a successful result); (3) continuing to use the ICV with limited functionality; (4) declaring the ICV useless and not utilizing the ICV.

Recognizing these and other shortcomings of existing techniques for operating ICVs, Applicants have developed novel systems and methods for operating and maintaining ICVs of hydrocarbon wells. The described embodiments can improve reliability of ICVs and, in turn, reduce the time and costs associated with maintaining and operating ICVs, while also improving performance. In some embodiments, particular aspects of the performance of ICVs are monitored to generate ICV performance data, the ICV performance data is assessed to determine an operational (e.g., "optimal") stroking frequency, and the ICVs are stroked at least at the operational stroking frequency in an effort to eliminate malfunctioning of the ICVs. For example, in some embodiments, monitoring operations are undertaken to gather ICV performance data for a relatively large number of ICVs installed in hydrocarbon wells, the ICV performance data for a set of ICVs having common operational characteristics (e.g., ICVs of the same type and/or having similar operating conditions) is assessed to determine a probability of failure ($P_f$) for the set of ICVs, the probability of failure ($P_f$) for the set of ICVs is used to determine an operational stroking frequency for the set of ICVs, and ICVs having the common characteristics are stroked at least at the operational stroking frequency.

Provided in some embodiments is a method that includes the following: identifying inflow control valves (ICVs) disposed in wellbores of hydrocarbon wells and having a common set of operational characteristics (each of the ICVs of a hydrocarbon well adapted to regulate the flow of production fluids from a subsurface formation into a production conduit of a wellbore of the hydrocarbon well; stroking each of the ICVs between an open position adapted to facilitate the flow of production fluids through the ICV and a closed position adapted to inhibit the flow of production fluids through the ICV; and monitoring operation of the inflow control valves. The monitoring including the following: identifying defective ICVs including a first subset of the ICVs that fail to stroke properly; identifying non-defective ICVs including a second subset of the ICVs that stroke properly; for each of the defective ICVs, determining a failure time including a duration of time between a last proper stroke of the ICV and the failure of the ICV to stroke properly; for each of the non-defective ICVs, determining a non-failure time including a duration of time between last two proper strokes of the ICV; determining a total number of the defective ICVs ($D_T$); and determining a total number of the non-defective ICVs ($ND_T$). The method further including determining a probability of failure of the ICVs ($P_f$), including the following: determining a defective valve cumulative probability distribution function ($P_D(T)$) defining a portion of the defective ICVs as a function of stroking duration (T) based on the failure times for the defective ICVs and the total number of the defective ICVs ($D_T$); determining a non-defective valve cumulative probability distribution function ($P_{ND}(T)$) defining a portion of the non-defective ICVs as a function of stroking duration (T) based on the non-failure times for the non-defective ICVs and the total number of the non-defective ICVs ($ND_T$); determining a reference stroking duration ($t_{ss}$); determining a failure function (F) defining an expected number of failed ICVs at stroking durations (T) less than the reference stroking duration ($t_{ss}$), the failure function (F) determined as follows:

$$F = P_D(T \leq t_{ss}) \times D_T;$$

determining a survival-failure function (SF) defining an expected number of failed ICVs at stroking durations (T) greater than the reference stroking duration ($t_{ss}$), the survival-failure function (SF) determined as follows:

$$SF = P_D(T > t_{ss}) \times D_T;$$

determining a survival-survival function (SS) defining an expected number of non-failed ICVs survivals for stroking durations (T) greater than the reference stroking duration ($t_{ss}$), the survival-survival function (SS) determined as follows:

$$SS = P_{ND}(T > t_{ss}) \times ND_T; \text{ and}$$

determining the probability of failure of the ICVs ($P_f$) as follows:

$$P_f = \frac{F}{F + SF + SS} = \frac{P_D(T \leq t_{ss}) \times D_T}{[P_D(T \leq t_{ss}) \times D_T + P_D(T > t_{ss}) \times D_T + P_{ND}(T > t_{ss}) \times ND_T]}.$$

The method further including determining total ICV management cost ($C_{MGT}$) including the following: determining a defective ICV cost ($C_D$) defining a cost to repair or replace a defective ICV; determining an ICV maintenance cost ($C_M$) defining a cost to maintain an ICV; and determining total ICV management cost ($C_{MGT}$) defining a cost for operating an ICV as a function of stroking duration. The total ICV management cost ($C_{MGT}$) determined as follows:

$$C_{MGT} = [C_{LR} \times P_f(T \leq t_{ss}) + C_{PM} \times R(T \leq t_{ss})] \times \frac{Z}{t_{ss}},$$

where $R(T \leq t_{ss}) = 1 - P_f(T \leq t_{ss})$ and Z is a time unit conversion factor. The method further including the following: determining an operational stroking duration including a stroking duration that corresponds to a minimum of the total ICV management cost ($C_{MGT}$); and, in response to determining the operational stroking duration, for one or more ICVs having the common set of operational characteristics: stroking the ICV at a first time; and stroking the ICV at a second time, where the duration between the first time and the second time is less than or equal to the operational stroking duration.

In some embodiments, the method further includes the following: determining a second operational stroking duration including a stroking duration that corresponds to the probability of failure of the ICVs ($P_f$) being less than a predefined percentage; and, in response to determining the second operational stroking duration, for one or more ICVs having the common set of operational characteristics: stroking the ICV at third time; and stroking the ICV at a fourth time, where the duration between the third time and the fourth time is less than or equal to the second operational stroking duration. In certain embodiments, the predefined percentage is 0%, and the second operational stroking duration is the greatest stroking duration for which the probability of failure of the ICVs ($P_f$) is 0%. In some embodiments, the common set of operational characteristics includes one or more of the following: a given valve type, a given valve size, a given valve installation depth interval, a given operating temperature range, a given operating pressure range, a given operating production fluid type, a given manufacturer, and a given valve model. In certain embodiments, determining the reference stroking duration ($t_{ss}$) includes selecting the reference stroking duration ($t_{ss}$) from a value between a minimum failure time identified and a maximum non-failure time identified.

Provided in some embodiments is a hydrocarbon well system that includes the following: inflow control valves (ICVs) disposed in wellbores of hydrocarbon wells and having a common set of operational characteristics (each of the ICVs of a hydrocarbon well adapted to regulate the flow of production fluids from a subsurface formation into a production conduit of a wellbore of the hydrocarbon well); and a hydrocarbon well monitoring and control system. The hydrocarbon well monitoring and control system adapted to perform the following operations: stroking each of the ICVs between an open position adapted to facilitate the flow of production fluids through the ICV and a closed position adapted to inhibit the flow of production fluids through the ICV; and monitoring operation of the inflow control valves. The monitoring including the following: identifying defective ICVs including a first subset of the ICVs that fail to stroke properly; identifying non-defective ICVs including a second subset of the ICVs that stroke properly; for each of the defective ICVs, determining a failure time including a duration of time between a last proper stroke of the ICV and the failure of the ICV to stroke properly; for each of the non-defective ICVs, determining a non-failure time including a duration of time between last two proper strokes of the ICV; determining a total number of the defective ICVs ($D_T$); and determining a total number of the non-defective ICVs ($ND_T$). The hydrocarbon well monitoring and control system further adapted to perform the operation of determining a probability of failure of the ICVs ($P_f$), including the following: determining a defective valve cumulative probability distribution function ($P_D(T)$) defining a portion of the defective ICVs as a function of stroking duration (T) based on the failure times for the defective ICVs and the total number of the defective ICVs ($D_T$); determining a non-defective valve cumulative probability distribution function ($P_{ND}(T)$) defining a portion of the non-defective ICVs as a function of stroking duration (T) based on the non-failure times for the non-defective ICVs and the total number of the non-defective ICVs ($ND_T$); determining a reference stroking duration ($t_{ss}$); determining a failure function (F) defining an expected number of failed ICVs at stroking durations (T) less than the reference stroking duration ($t_{ss}$), the failure function (F) determined as follows:

$$F = P_D(T \le t_{ss}) \times D_T;$$

determining a survival-failure function (SF) defining an expected number of failed ICVs at stroking durations (T) greater than the reference stroking duration ($t_{ss}$), the survival-failure function (SF) determined as follows:

$$SF = P_D(T > t_{ss}) \times D_T;$$

determining a survival-survival function (SS) defining an expected number of non-failed ICVs survivals for stroking durations (T) greater than the reference stroking duration ($t_{ss}$), the survival-survival function (SS) determined as follows:

$$SS = P_{ND}(T > t_{ss}) \times ND_T; \text{ and}$$

determining the probability of failure of the ICVs ($P_f$) as follows:

$$P_f = \frac{F}{F + SF + SS} = \frac{P_D(T \le t_{ss}) \times D_T}{[P_D(T \le t_{ss}) \times D_T + P_D(T > t_{ss}) \times D_T + P_{ND}(T > t_{ss}) \times ND_T]}.$$

The hydrocarbon well monitoring and control system further adapted to perform the operation of determining a total ICV management cost ($C_{MGT}$), including the following: determining a defective ICV cost ($C_D$) defining a cost to repair or replace a defective ICV; determining an ICV maintenance cost ($C_M$) defining a cost to maintain an ICV; and determining total ICV management cost ($C_{MGT}$) defining a cost for operating an ICV as a function of stroking duration. The total ICV management cost ($C_{MGT}$) determined as follows:

$$C_{MGT} = [C_{LR} \times P_f(T \le t_{ss}) + C_{PM} \times R(T \le t_{ss})] \times \frac{Z}{t_{ss}},$$

where R ($T \le t_{ss}$)=1−$P_f$($T \le t_{ss}$) and Z is a time unit conversion factor. The hydrocarbon well monitoring and control system further adapted to perform the following operations: determining an operational stroking duration including a stroking duration that corresponds to a minimum of the total ICV management cost ($C_{MGT}$); and, in response to determining the operational stroking duration, for one or more ICVs having the common set of operational characteristics: stroking the ICV at a first time; and stroking the ICV at a second time, where the duration between the first time and the second time is less than or equal to the operational stroking duration.

In some embodiments, the hydrocarbon well monitoring and control system further adapted to perform the following operations: determining a second operational stroking duration including a stroking duration that corresponds to the probability of failure of the ICVs ($P_f$) being less than a predefined percentage; and in response to determining the second operational stroking duration, for one or more ICVs having the common set of operational characteristics: stroking the ICV at third time; and stroking the ICV at a fourth time, where the duration between the third time and the fourth time is less than or equal to the second operational stroking duration. In certain embodiments, the predefined percentage is 0%, and the second operational stroking duration is the greatest stroking duration for which the probability of failure of the ICVs ($P_f$) is 0%. In certain embodiments, the common set of operational characteristics includes one or more of the following: a given valve type, a given valve size, a given valve installation depth interval, a given operating temperature range, a given operating pressure range, a given operating production fluid type, a given manufacturer, and a given valve model. In some embodiments, determining the reference stroking duration ($t_{ss}$) includes selecting the reference stroking duration ($t_{ss}$) from a value between a minimum failure time identified and a maximum non-failure time identified.

Provided in some embodiments is a non-transitory computer readable medium including program instructions stored thereon that are executable by a processor to cause the following operations: identifying inflow control valves (ICVs) disposed in wellbores of hydrocarbon wells and having a common set of operational characteristics (each of the ICVs of a hydrocarbon well adapted to regulate the flow of production fluids from a subsurface formation into a production conduit of a wellbore of the hydrocarbon well); stroking each of the ICVs between an open position adapted to facilitate the flow of production fluids through the ICV and a closed position adapted to inhibit the flow of production fluids through the ICV; and monitoring operation of the inflow control valves. The monitoring including the following: identifying defective ICVs including a first subset of the ICVs that fail to stroke properly; identifying non-defective ICVs including a second subset of the ICVs that stroke properly; for each of the defective ICVs, determining a failure time including a duration of time between a last proper stroke of the ICV and the failure of the ICV to stroke properly; for each of the non-defective ICVs, determining a non-failure time including a duration of time between last two proper strokes of the ICV; determining a total number of the defective ICVs ($D_T$); and determining a total number of the non-defective ICVs ($ND_T$). The operations further including determining a probability of failure of the ICVs ($P_f$), including the following: determining a defective valve cumulative probability distribution function ($P_D(T)$) defining a portion of the defective ICVs as a function of stroking duration (T) based on the failure times for the defective ICVs and the total number of the defective ICVs ($D_T$); determining a non-defective valve cumulative probability distribution function ($P_{ND}(T)$) defining a portion of the non-defective ICVs as a function of stroking duration (T) based on the non-failure times for the non-defective ICVs and the total number of the non-defective ICVs ($ND_T$); determining a reference stroking duration ($t_{ss}$); determining a failure function (F) defining an expected number of failed ICVs at stroking durations (T) less than the reference stroking duration ($t_{ss}$), the failure function (F) determined as follows:

$$F = P_D(T \le t_{ss}) \times D_T;$$

determining a survival-failure function (SF) defining an expected number of failed ICVs at stroking durations (T) greater than the reference stroking duration ($t_{ss}$), the survival-failure function (SF) determined as follows:

$$SF = P_D(T > t_{ss}) \times D_T;$$

determining a survival-survival function (SS) defining an expected number of non-failed ICVs survivals for stroking durations (T) greater than the reference stroking duration ($t_{ss}$), the survival-survival function (SS) determined as follows:

$$SS = P_{ND}(T > t_{ss}) \times ND_T;\text{ and}$$

determining the probability of failure of the ICVs ($P_f$) as follows:

$$P_f = \frac{F}{F + SF + SS} = \frac{P_D(T \le t_{ss}) \times D_T}{[P_D(T \le t_{ss}) \times D_T + P_D(T > t_{ss}) \times D_T + P_{ND}(T > t_{ss}) \times ND_T]}.$$

The operations further including determining total ICV management cost ($C_{MGT}$), including the following: determining a defective ICV cost ($C_D$) defining a cost to repair or replace a defective ICV; determining an ICV maintenance cost ($C_M$) defining a cost to maintain an ICV; and determining total ICV management cost ($C_{MGT}$) defining a cost for operating an ICV as a function of stroking duration. The total ICV management cost ($C_{MGT}$) determined as follows:

$$C_{MGT} = [C_{LR} \times P_f(T \le t_{ss}) + C_{PM} \times R(T \le t_{ss})] \times \frac{Z}{t_{ss}},$$

where $R(T \le t_{ss}) = 1 - P_f(T \le t_{ss})$ and Z is a time unit conversion factor. The operations further including the following: determining an operational stroking duration including a stroking duration that corresponds to a minimum of the total ICV management cost ($C_{MGT}$); and, in response to determining the operational stroking duration, for one or more ICVs having the common set of operational characteristics: stroking the ICV at a first time; and stroking the ICV at a second time, where the duration between the first time and the second time is less than or equal to the operational stroking duration.

In some embodiments, the operations further include: determining a second operational stroking duration including a stroking duration that corresponds to the probability of failure of the ICVs ($P_f$) being less than a predefined percentage; and, in response to determining the second operational stroking duration, for one or more ICVs having the common set of operational characteristics: stroking the ICV at third time; and stroking the ICV at a fourth time, where the duration between the third time and the fourth time is less than or equal to the second operational stroking duration. In certain embodiments, the predefined percentage is 0%, and the second operational stroking duration is the greatest stroking duration for which the probability of failure of the ICVs ($P_f$) is 0%. In some embodiments, the common set of operational characteristics includes one or more of the following: a given valve type, a given valve size, a given valve installation depth interval, a given operating temperature range, a given operating pressure range, a given operating production fluid type, a given manufacturer, and a given valve model. In certain embodiments, determining the reference stroking duration ($t_{ss}$) includes selecting the reference stroking duration ($t_{ss}$) from a value between a minimum failure time identified and a maximum non-failure time identified.

Provided in some embodiments is a method that includes the following: identifying inflow control valves (ICVs) disposed in wellbores of hydrocarbon wells and having a common set of characteristics; stroking each of the ICVs between an open position adapted to facilitate the flow of production fluids through the ICV and a closed position adapted to inhibit the flow of production fluids through the ICV; monitoring operation of the inflow control valves including: identifying defective ICVs including a first subset of the ICVs that fail to stroke properly; identifying non-defective ICVs including a second subset of the ICVs that stroke properly; for each of the defective ICVs, determining a failure time including a duration of time between a last proper stroke of the ICV and the failure of the ICV to stroke properly; for each of the non-defective ICVs, determining a non-failure time including a duration of time between the last two proper strokes of the ICV; determining a total number of the defective ICVs ($D_T$); and determining a total number of the non-defective ICVs ($ND_T$); determining a probability of failure of the ICVs ($P_f$) including: determining a defective valve cumulative probability distribution function ($P_D(T)$) defining a portion of the defective ICVs as a function of stroking duration (T) based on the failure times for the defective ICVs and the total number of the defective ICVs ($D_T$); determining a non-defective valve cumulative probability distribution function ($P_{ND}(T)$) defining a portion of the non-defective ICVs as a function of stroking duration (T) based on the non-failure times for the non-defective ICVs and the total number of the non-defective ICVs ($ND_T$); determining a reference stroking duration ($t_{ss}$); determining a failure function (F) defining an expected number of failed ICVs at stroking durations (T) less than the reference stroking duration ($t_{ss}$); determining a survival-failure function (SF) defining an expected number of failed ICVs at stroking durations (T) greater than the reference stroking duration ($t_{ss}$); determining a survival-survival function (SS) defining an expected number of non-failed ICVs survivals for stroking durations (T) greater than the reference stroking duration ($t_{ss}$); and determining the probability of failure of the ICVs ($P_f$) based on the failure function (F), the survival failure function (SF) and the survival-survival function (SS); determining an operational stroking duration based on the probability of failure of the ICVs ($P_f$); and in response to determining the operational stroking duration, for one or more ICVs having the common set of operational characteristics: stroking the ICV at a first time; and stroking the ICV at a second time, where the duration between the first time and the second time is less than or equal to the operational stroking duration.

In some embodiments, the failure function (F) determined as follows:

$$F = P_D(T \le t_{ss}) \times D_T,$$

the survival-failure function (SF) determined as follows:

$$SF = P_D(T > t_{ss}) \times D_T,$$

the survival-survival function (SS) determined as follows:

$$SS = P_{ND}(T > t_{ss}) \times ND_T, \text{ and}$$

the probability of failure of the ICVs ($P_f(T)$) determined as follows:

$$P_f = \frac{F}{F + SF + SS}.$$

In certain embodiments, determining an operational stroking duration based on the probability of failure of the ICVs ($P_f$) includes determining a second operational stroking duration including a stroking duration that corresponds to the probability of failure of the ICVs ($P_f$) being less than a predefined percentage. In some embodiments, determining an operational stroking duration based on the probability of failure of the ICVs ($P_f$) includes: determining total ICV management cost ($C_{MGT}$) including: determining a defective ICV cost ($C_D$) defining a cost to repair or replace a defective ICV; determining an ICV maintenance cost ($C_M$) defining a cost to maintain an ICV; and determining total ICV management cost ($C_{MGT}$) defining a cost for operating an ICV as a function of stroking duration. The total ICV management cost ($C_{MGT}$) determined as follows:

$$C_{MGT} = [C_{LR} \times P_f(T \le t_{ss}) + C_{PM} \times R(T \le t_{ss})] \times \frac{1Z2}{t_{ss}},$$

where $R(T \le t_{ss}) = 1 - P_f(T \le t_{ss})$ and Z is a time unit conversion factor; and determining the operational stroking duration as a stroking duration that corresponds to a minimum of the total ICV management cost ($C_{MGT}$).

Figure 1:
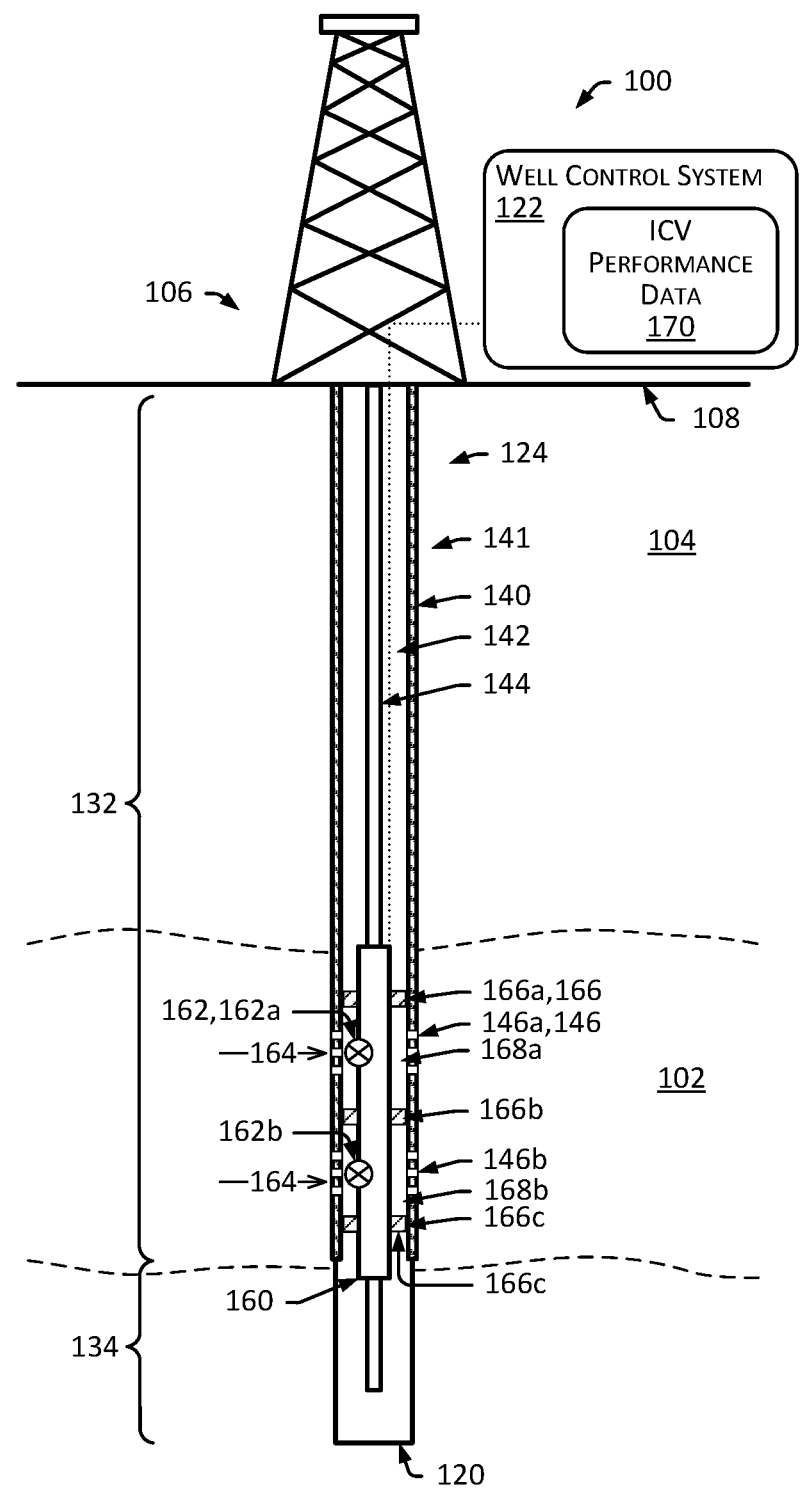
FIG. 1 is diagram that illustrates a well environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of novel systems and methods for operating and maintaining downhole inflow control valves (ICVs) of hydrocarbon wells. The described embodiments can improve reliability of ICVs and, in turn, reduce the time and costs associated with maintaining and operating ICVs, while also improving performance. In some embodiments, particular aspects of the performance of ICVs are monitored to generate ICV performance data, the ICV performance data is assessed to determine an operational (e.g., "optimal") stroking frequency, and the ICVs are stroked at least at the operational stroking frequency in an effort to eliminate malfunctioning of the ICVs. For example, in some embodiments, monitoring operations are undertaken to gather ICV performance data for a relatively large number of ICVs installed in hydrocarbon wells, the ICV performance data for a set of ICVs having common operational characteristics (e.g., ICVs of the same type and/or having similar operating conditions) is assessed to determine a probability of failure ($P_f$) for the set of ICVs, the probability of failure ($P_f$) for the set of ICVs is used to determine an operational stroking frequency for the set of ICVs, and ICVs having the common characteristics are stroked at least at the operational stroking frequency.

In some embodiments, the monitoring operations undertaken to gather ICV performance data for a relatively large number of ICVs installed in hydrocarbon wells includes identifying which, if any, of the ICVs are defective and which of the ICVs are non-defective. A defective ICV may include an ICV that has failed to stroke properly, such as being stuck in a given position (or "step") or being unable to move to a given position. A non-defective ICV may include an ICV that is stroking properly, and is thus capable of operating across its full range of operation (e.g., the ICV is capable of moving into each of the fully opened and fully closed positions, and each of the partially opened steps between the fully opened and fully closed positions). In some embodiments, the ICV performance data includes, for each of the defective ICVs, a failure time that specifies a duration of time between a last proper stroke of the ICV and the failure of the ICV to stroke properly, and, for each of the non-defective ICVs, a non-failure time specifying a duration of time between the last two proper strokes of the ICV.

In some embodiments, determining a probability of failure ($P_f$) for a set of ICVs includes the following: (1) determining a defective valve cumulative probability distribution function ($P_D(T)$) defining a portion of the defective ICVs of the set of ICVs as a function of stroking duration (T) (e.g., a duration of time between consecutive stokes of an ICV 162) based on the failure times for the defective ICVs and the total number of the defective ICVs ($D_T$) in the set of ICVs; (2) determining a non-defective valve cumulative probability distribution function ($P_{ND}(T)$) defining a portion of the non-defective ICVs of the set of ICVs as a function of stroking duration (T) based on the non-failure times for the non-defective ICVs and the total number of the non-defective ICVs ($ND_T$) in the set of ICVs; (3) determining a reference stroking duration ($t_{ss}$); (4) determining a failure function (F) defining an expected number of failed ICVs at stroking durations (T) less than the reference stroking duration ($t_{ss}$); (5) determining a survival-failure function (SF) defining an expected number of failed ICVs at stroking durations (T) greater than the reference stroking duration ($t_{ss}$); (6) determining a survival-survival function (SS) defining an expected number of non-failed ICV survivals for stroking durations (T) greater than the reference stroking duration ($t_{ss}$); and (7) determining the probability of failure of the ICVs ($P_f$) based on the failure function (F), the survival failure function (SF) and the survival-survival function (SS).

In some embodiments, determining an operational stroking frequency for the set of ICVs includes determining a stroking frequency to minimize costs for maintaining and operating ICVs having the common characteristics (referred to as an "economical" stroking frequency) and/or determining a stroking frequency to minimize failures of the ICVs having the common characteristics (referred to as a "performance" stroking frequency). The economical stroking frequency may be based on costs for maintaining, repairing and/or replacing an ICV. The performance stroking frequency may be determined based on the probability of failure of the ICVs ($P_f$).

In some embodiments, stroking ICVs having the common characteristics at least at the operational stroking frequency includes stroking ICVs (e.g., ICVs in the set of ICVs and/or other ICVs having the common characteristics) at a frequency that is equal to or greater than the operational stroking frequency determined for the set of ICVs. For example, where the operational stroking frequency is determined to be once every thirty months, an ICV having the common characteristics (e.g., an ICV of the same type and/or having similar operating conditions to the ICVs of the set of ICVs) may be stroked on a first day and then be stroked again thirty months after the first day, or sooner. Such a stroking schedule may help to flush the ICVs having the common characteristics of debris, to reduce the likelihood of failure of the ICVs.

FIG. 1 is diagram that illustrates a well environment 100 in accordance with one or more embodiments. In the illustrated embodiment, the well environment 100 includes a hydrocarbon reservoir ("reservoir") 102 located in a subsurface formation ("formation") 104 and a well system ("well") 106.

The formation 104 may include a porous or fractured rock formation that resides underground, beneath the earth's surface ("surface") 108. In the case of the well 106 being a hydrocarbon well, the reservoir 102 may include a portion of the formation 104 that contains (or that is at least determined to or expected to contain) a subsurface pool of hydrocarbons, such as oil and gas. The formation 104 and the reservoir 102 may each include different layers of rock having varying characteristics, such as varying degrees of permeability, porosity, and resistivity. In the case of the well 106 being operated as a production well, the well 106 may facilitate the extraction of hydrocarbons (or "production") from the reservoir 102. In the case of the well 106 being operated as an injection well, the well 106 may facilitate the injection of fluids, such as water, into the reservoir 102. In the case of the well 106 being operated as a monitoring well, the well 106 may facilitate the monitoring of characteristics of the reservoir 102, such reservoir pressure or water encroachment.

The well 106 may include a wellbore 120, a well control system ("control system") 122 and a wellbore production system 124. The control system 122 may control various operations of the well 106, such as well drilling operations, well completion operations, well production operations, and well and formation monitoring operations. In some embodiments, the control system 122 includes a computer system that is the same as or similar to that of computer system 1000 described with regard to at least FIG. 5.

The wellbore 120 may include a bored hole that extends from the surface 108 into a target zone of the formation 104, such as the reservoir 102. An upper end of the wellbore 120, at or near the surface 108, may be referred to as the "up-hole" end of the wellbore 102, and a lower end of the wellbore, terminating in the formation 104, may be referred to as the "down-hole" end of the wellbore 120. The wellbore 120 may be created, for example, by a drill bit boring through the formation 104 and the reservoir 102. The wellbore 120 can provide for the circulation of drilling fluids during drilling operations, the flow of hydrocarbons (e.g., oil and gas) from the reservoir 102 to the surface 108 during production operations, the injection of substances (e.g., water) into one or both of the formation 104 and the reservoir 102 during injection operations, or the communication of monitoring devices (e.g., logging tools) into one or both of the formation 104 and the reservoir 102 during monitoring operations (e.g., during in situ logging operations).

In some embodiments, the wellbore 120 includes cased and/or uncased portions. For example the wellbore 120 may have a cased portion 132 and an uncased (or "open-hole") portion 134. The cased portion 132 may include a portion of the wellbore 120 having casing 140 (e.g., casing pipe and/or casing cement) disposed therein. The uncased portion 134 may include a portion of the wellbore 120 not having casing 140 disposed therein.

In some embodiments, the casing 140 includes an annular casing that lines the wall 141 of the wellbore 120 to define a central passage 142 that provides a conduit for the transport of tools and substances through the wellbore 120. For example, the central passage 142 may provide a conduit for lowering logging tools into the wellbore 120, a conduit for the flow of production fluids, such as oil and gas, from the reservoir 102 to the surface 108, or a conduit for the flow of injection substances, such as water, from the surface 108 into the formation 104. In some embodiments, production tubing 144 is provided to provide an additional conduit for the transport of tools and substances through the wellbore 120. The production tubing 144 may, for example, be disposed inside the casing 140. In such an embodiment, the production tubing 144 may provide a conduit for some or all of the production fluids through the wellbore 120 and the casing 140.

In some embodiments, the casing 140 includes perforations 146 (e.g., perforations 146a and 146b). The perforations 146 may include openings that extend between an exterior of the casing 140 and the central passage 142 of the casing 140, to facilitate the flow of production fluids, such as oil and gas, from the formation 104 into the central passage 142, or to facilitate the flow of injection substances, such as water, from the central passage 142 into the formation 104. Perforations 146 can take various forms, such as one or more elongated holes in the casing 140 or a mesh structure defined by a plurality of relatively small holes that enable the flow of substances across the holes, while also filtering out larger debris from the flowing substance.

In some embodiments, a completion unit 160 disposed in the wellbore 120 includes one or more inflow control valves (ICVs) 162 (e.g., ICVs 162a and 162b) disposed in the wellbore 120. An ICV 162 may regulate the flow of substances, such as oil, gas and water, between the formation 104 and a production conduit, such as the central passage 142 of the casing 140 or the production tubing 144. For example, an ICV 162 may be provided in a fully opened position to enable full flow of production fluid 164 from the reservoir 102 into the central passage 142 or the production tubing 144, an ICV 162 may be provided in a partially opened position to enable partial (or "choked") flow of production fluid 164 from the reservoir 102 into the central passage 142 of the casing 140 or the production tubing 144, or an ICV 150 may be provided in a fully closed position to block (or "choke") the flow of production fluid 164 from the reservoir 102 to prevent the production fluid from entering into the central passage 142 or the production tubing 144.

In some embodiments, the ICVs 162 are positioned to regulate the flow of production fluid 164 from a particular region of the formation 104 and wellbore 120. When installed inside casing 140, for example, the completion unit 160 may include completion packers 166 (e.g., completion packers 166a, 166b and 166c) expanded against the casing 140 to isolate (or "seal-off") portions of the annular region located between the exterior of the production tubing 144 and the interior wall of the casing 140, to regulate the flow of production fluid 164 from a particular region of the formation 104. For example, the completion packers 166a and 166b may provide a seal between the exterior of the production tubing 144 and the interior wall of the casing 140 to define a first interior region 168a in communication with a first portion of the reservoir 102 by way of perforations 146a, and the completion packers 166b and 166c may provide a seal between the exterior of the production tubing 144 and the interior wall of the casing 140 to define a second interior region 168b in communication with a second portion of the reservoir 102 by way of perforations 146b. The first ICV 162a may regulate the flow of production fluid 164 into the production tubing 144 by way of the perforations 146a and the first interior region 168a. The second ICV 162b may regulate the flow of production fluid 164 into the production tubing 144 by way of the perforations 146b and the first interior region 168a. Each of the ICVs 162a and 162b may be independently fully opened to enable full flow of production fluid 152 from the corresponding portion of the reservoir 102 into the production tubing 144, may be partially opened to enable partial (or "choked") flow of production fluid 164 from the corresponding portion of the reservoir 102 into the production tubing 144, or may be fully closed to block (or "choke") the flow of production fluid 152 from the corresponding portion of the reservoir 102 into the central passage 142 or the production tubing 144. Although the completion unit 160 has been described with regard to a cased portion of a wellbore, a completion unit may be provided in an opened hole portion of a wellbore. For example, the completion unit 160 may be disposed in the opened hole portion 134 of the wellbore 120. In such an embodiment, the completion packers 166 (e.g., completion packers 166a, 166b and 166c) may seal directly against the wall 141 of the wellbore 120, as opposed to the interior of the casing 140. Moreover, although a single completion unit 160 with two ICVs 162 installed in a cased portion of a wellbore has been described for the purpose of illustration, embodiments can include any number of completion units with any number of ICVs installed in cased and/or uncased portions of a wellbore.

In some embodiments, particular aspects of the performance of ICVs 162 are monitored to generate ICV performance data 170, the ICV performance data 170 is assessed to determine an operational stroking frequency, and the ICVs 162 are stroked at least at the operational stroking frequency in an effort to eliminate malfunctioning of the ICVs 162. For example, in some embodiments, monitoring operations are undertaken to gather ICV performance data 170 for a relatively large number of ICVs 162 installed in hydrocarbon wells, including the well system 106, the ICV performance data 170 for a set of ICVs 162 having common characteristics (e.g., ICVs 162 of the same type and having similar operating conditions) is assessed to determine a probability of failure $(P_f)$ for the set of ICVs 162, the probability of failure $(P_f)$ for the set of ICVs 162 is used to determine an operational stroking frequency for the set of ICVs 162, and ICVs 162 having the common characteristics are stroked at least at the operational stroking frequency in an effort to eliminate malfunctioning of the ICVs 162.

In some embodiments, the monitoring operations undertaken to gather ICV performance data 170 for a relatively large number of ICVs 162 installed in hydrocarbon wells includes identifying which, if any, of the ICVs 162 are defective and which of the ICVs 162 are non-defective. A defective ICV 162 may include an ICV 162 that has failed to stroke properly, such as being stuck in a given position (or "step") or being unable to move to a given position. A non-defective ICV 162 may include an ICV 162 that is stroking properly, and is thus capable of operating across its full range of operation (e.g., the ICV 162 is capable of moving into each of the fully opened and fully closed positions, and each of the partially opened steps between the fully opened and fully closed positions). In some embodiments, the ICV performance data 170 includes, for each of the defective ICVs 162, a failure time that specifies a duration of time between a last proper stroke of the ICV 162 and the failure of the ICV 162 to stroke properly, and, for each of the non-defective ICVs 162, a non-failure time specifying a duration of time between the last two proper strokes of the ICV 162.

In some embodiments, determining a probability of failure $(P_f)$ for a set of ICVs 162 includes the following: (1) determining a defective valve cumulative probability distribution function $(P_D(T))$ defining a portion of the defective ICVs 162 of the set of ICVs 162 as a function of stroking duration (T) based on the failure times for the defective ICVs 162 and the total number of the defective ICVs 162 $(D_T)$ in the set of ICVs 162; (2) determining a non-defective valve cumulative probability distribution function $(P_{ND}(T))$ defining a portion of the non-defective ICVs 162 of the set of ICVs 162 as a function of stroking duration (T) based on the non-failure times for the non-defective ICVs 162 and the total number of the non-defective ICVs 162 $(ND_T)$ in the set of ICVs 162; (3) determining a reference stroking duration $(t_{ss})$; (4) determining a failure function (F) defining an expected number of failed ICVs 162 at stroking durations (T) less than the reference stroking duration $(t_{ss})$; (5) determining a survival-failure function (SF) defining an expected number of failed ICVs 162 at stroking durations (T) greater than the reference stroking duration $(t_{ss})$; (6) determining a survival-survival function (SS) defining an expected number of non-failed ICVs 162 survivals for stroking durations (T) greater than the reference stroking duration $(t_{ss})$; and (7)

determining the probability of failure of the ICVs 162 ($P_f$) based on the failure function (F), the survival failure function (SF) and the survival-survival function (SS).

In some embodiments, determining an operational stroking frequency for the set of ICVs 162 includes determining a stroking frequency to minimize costs for maintaining and operating ICVs 162 having the common characteristics (referred to as an "economical" stroking frequency) and/or determining a stroking frequency to minimize failures of the ICVs 162 having the common characteristics (referred to as a "performance" stroking frequency). The economical stroking frequency may be based on costs for maintaining, repairing and/or replacing an ICV. The performance stroking frequency may be determined based on the probability of failure of the ICVs ($P_f$).

In some embodiments, stroking ICVs 162 having the common characteristics at least at the operational stroking frequency includes stroking ICVs 162 (e.g., ICVs 162 in the set of ICVs 162 and/or other ICVs having the common characteristics) at a frequency that is equal to or greater than the operational stroking frequency determined for the set of ICVs 164. For example, where the operational stroking frequency is determined to be once every thirty months, an ICV 164 having the common characteristics (e.g., an ICV 162 of the same type and having similar operating conditions to the ICVs 162 of the set of ICVs 162) may be stroked on a first day and then be stroked again thirty months after the first day, or sooner. Such a stroking schedule may help to flush the ICVs 162 having the common characteristics of debris, to reduce the likelihood of failure of the ICVs 162.

Figure 2:
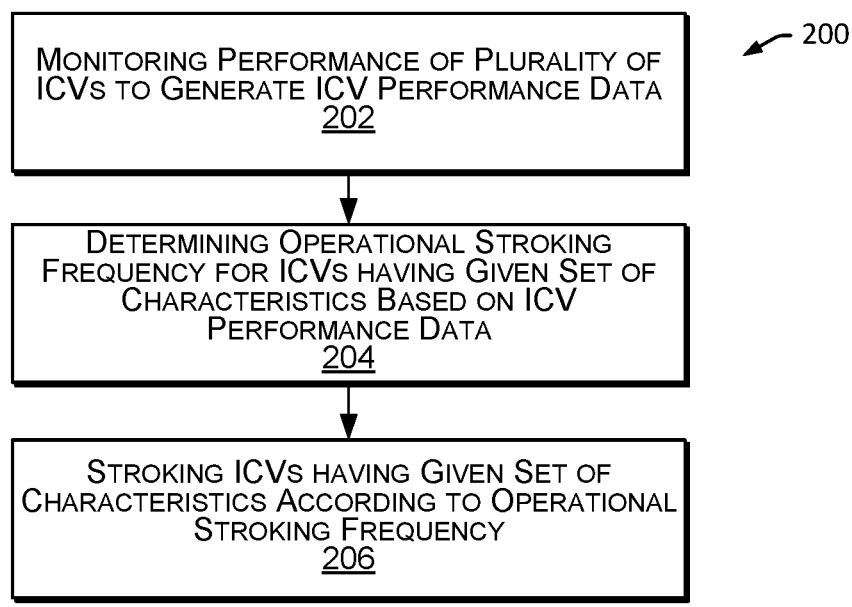
FIG. 2 is a flowchart that illustrates a method of maintaining inflow control valves (ICVs) in accordance with one or more embodiments.

FIG. 2 is a flowchart that illustrates a method 200 of maintaining ICVs in accordance with one or more embodiments. Method 200 may include monitoring the performance of a plurality of ICVs 162 to generate ICV performance data (block 202), determining an operational stroking frequency for ICVs having a given set of characteristics based on the ICV performance data (block 204), and stroking ICVs having the given set of characteristics according to the operational stroking frequency (block 206). In some embodiments, some or all of the operations of method 200 are performed by the well control system 122.

In some embodiments, monitoring the performance of a plurality of ICVs to generate ICV performance data (block 202) includes monitoring a plurality of ICVs 162 located in one or more well system 106. For example, monitoring the performance of a plurality of ICVs 162 may include the well control system 122 gathering ICV performance data 170 for one thousand ICVs 162 installed in wellbores of hydrocarbon wells, including the wellbore 120 of the well system 106. In some embodiments, the ICV performance data 170 for each ICV 162 includes characteristics of the ICV 162 and an indication of whether or not the ICV 162 is defective. The characteristics for each ICV 162 can include valve characteristics, such as the type, the size, the manufacturer and/or the valve model, and/or valve operational characteristics, such as an installation depth interval (e.g., 10,000 m-11,000 m), an operating temperature range (e.g., 50° C.-60° C.), an operating pressure range (e.g., 5,000 psi-6,000 psi) and/or an operating production fluid type (e.g., oil with 5%-10% watercut). A defective ICV 162 may include an ICV 162 determined to have failed to stroke properly, such as an ICV 162 determined to be stuck in a given position (or "step") and/or determined to be unable to move to a given position. A non-defective ICV 162 may include an ICV 162 determined to be stroking properly, such as an ICV 162 determined to be capable of operating across its full range of operation (e.g., the ICV 162 is capable of moving into each of the fully opened and fully closed positions, and each of the partially opened steps between the fully opened and fully closed positions). In some embodiments, the ICV performance data 170 includes information regarding the last two attempted strokes of the ICV 170. For example, the ICV performance data 170 may include, for each of the defective ICVs 162, a failure time that specifies a duration of time between a last proper stroke of the ICV 162 and the failure of the ICV 162 to stroke properly, and, for each of the non-defective ICVs 162, a non-failure time specifying a duration of time between the last two proper strokes of the ICV 162. For example, if the ICV 162a was stroked successfully one day and failed to stroke properly seventy-five months later, the ICV performance data 170 for the defective ICV 162a may include a failure time of seventy-five months. As a further example, if the ICV 162b was most recently stroked successfully today, and the prior successful stroking (the last successful stroking before today's successful stroking) was one hundred months prior to today, the ICV performance data 170 for the non-defective ICV 162b may include a non-failure time of one hundred months.

In some embodiments, determining an operational stroking frequency for ICVs having a given set of characteristics based on the ICV performance data (block 204) includes determining a probability of failure ($P_f$) for a set of ICVs 162 having common characteristics based on the ICV performance data 170 for the set of ICVs 162. Continuing with the prior example, determining an operational stroking frequency for ICVs 162 having a given set of characteristics may include the well control system 122 identifying, from the one thousand ICVs 162 monitored to generate the ICV performance data 170, a set of one-hundred of the one thousand ICVs 162 having a common set of characteristics, such as the same valve type and the same operating temperature and pressure range, and determining an operational stroking frequency for ICVs 162 having the common set of characteristics based on the ICV performance data 170 for the set of one-hundred ICVs 162 identified.

Figure 3:
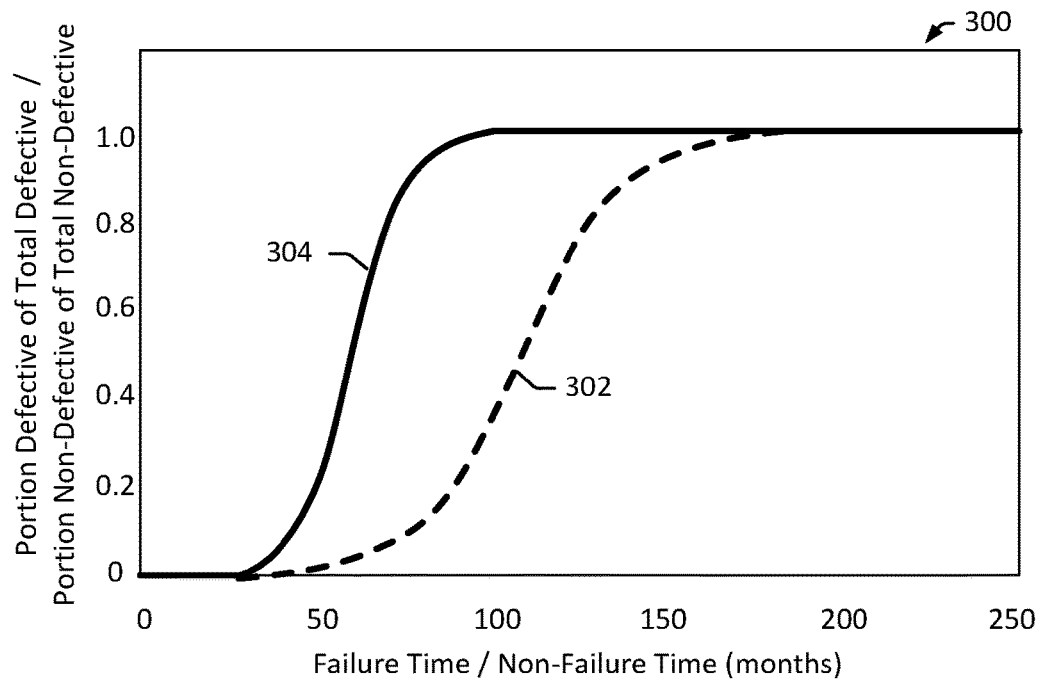
FIG. 3 is a diagram that illustrates an example results distribution plot, including a defective valve cumulative probability distribution curve and a non-defective valve cumulative probability distribution curve, in accordance with one or more embodiments.

In some embodiments, determining a probability of failure ($P_f$) for a set of ICVs 162 includes determining a defective valve cumulative probability distribution function ($P_D(T)$) defining a portion of the defective ICVs 162 of the set of ICVs 162 as a function of stroking duration (T) based on the failure times for the defective ICVs 162 and the total number of the defective ICVs 162 ($D_T$) in the set of ICVs 162, and determining a non-defective valve cumulative probability distribution function ($P_{ND}(T)$) defining a portion of the non-defective ICVs 162 of the set of ICVs 162 as a function of stroking duration (T) based on the non-failure times for the non-defective ICVs 162 and the total number of the non-defective ICVs 162 ($ND_T$) in the set of ICVs 162. FIG. 3 is a diagram that illustrates an example results distribution plot 300 including a defective valve cumulative probability distribution curve 302 that corresponds to a defective valve cumulative probability distribution function ($P_D(T)$), and a non-defective valve cumulative probability distribution curve 304 that corresponds to a non-defective valve cumulative probability distribution function ($P_{ND}(T)$), in accordance with one or more embodiments. The defective valve cumulative probability distribution curve 302 represents the portion of the defective ICVs 162 for each corresponding failure time. For example, the defective valve cumulative probability distribution curve 302 represents, for each failure time, a number of defective ICVs 162 of the defective ICVs 162 having a failure time less than or equal to the failure time, divided by the total number of the defective ICVs 162 ($D_T$) in the set of ICVs 162. The non-defective valve cumulative probability distribution curve 304 represents the portion of the non-defective ICVs 162 for each corresponding non-failure times. For example, the non-defective valve cumulative probability distribution curve 304 represents, for each non-failure time, a number of non-defective ICVs 162 of the non-defective ICVs 162 having a non-failure time less than or equal to the non-failure time, divided by the total number of the non-defective ICVs 162 ($ND_T$) in the set of ICVs 162. Continuing with the prior example and referring to FIG. 3, if forty of the one hundred ICVs 162 are determined to be defective and sixty of the one hundred ICVs 162 are determined to be non-defective, the defective valve cumulative probability distribution curve 302 may indicate that at about 40% of the forty defective ICVs 162 (e.g., about sixteen of the defective ICVs 162) have failure times of about one hundred months or less, and the non-defective valve cumulative probability distribution curve 304 may indicate that at about 20% of the sixty non-defective ICVs 162 (e.g., about twelve of the non-defective ICVs 162) have non-failure times of about one fifty months or less. Notably, the illustrated defective valve cumulative probability distribution curve 302 indicates that the defective ICVs 162 have failure times within a range of about thirty five months to about one hundred seventy five months, and the illustrated non-defective valve cumulative probability distribution curve 304 indicates that the non-defective ICVs 162 had non-failure times within a range of about forty months to about ninety five months.

In some embodiments, determining a probability of failure ($P_f$) for a set of ICVs 162 includes determining a reference stroking duration ($t_{ss}$). In some embodiments, the reference stroking duration ($t_{ss}$) is selected from between the minimum failure time and the maximum non-failure time identified. Thus, for example, the reference stroking duration ($t_{ss}$) may be between the about thirty five months to about ninety five months. In some embodiment, a probability of failure ($P_f$) for a set of ICVs 162 includes determining a probability of failure ($P_f$) for each reference stroking duration ($t_{ss}$) of a range of reference stroking durations ($t_{ss}$). For example, a probability of failure ($P_f$) may be determined for each month from about thirty five months to about ninety five months.

In some embodiments, determining a probability of failure ($P_f$) for a set of ICVs 162 includes determining a failure function (F) defining an expected number of failed ICVs 162 at stroking durations (T) less than the reference stroking duration ($t_{ss}$). The failure function (F) may be determined as follows:

$$F = P_D(T \le t_{ss}) \times D_T \quad (1)$$

In some embodiments, determining a probability of failure ($P_f$) for a set of ICVs 162 includes determining a survival-failure function (SF) defining an expected number of failed ICVs 162 at stroking durations (T) greater than the reference stroking duration ($t_{ss}$). The survival-failure function (SF) may be determined as follows:

$$SF = P_D(T > t_{ss}) \times D_T \quad (2)$$

In some embodiments, determining a probability of failure ($P_f$) for a set of ICVs 162 includes determining a survival-survival function (SS) defining an expected number of non-failed ICVs 162 survivals for stroking durations (T) greater than the reference stroking duration ($t_{ss}$). The survival-survival function (SS) may be determined as follows:

$$SS = P_{ND}(T > t_{ss}) \times ND_T \quad (3)$$

In some embodiments, determining a probability of failure ($P_f$) for a set of ICVs 162 includes determining the probability of failure for the set of ICVs 162 ($P_f$) based on the failure function (F), the survival failure function (SF) and the survival-survival function (SS). The probability of failure of the ICV ($P_f$) may be determined as follows:

$$P_f = \frac{F}{F + SF + SS} = \frac{P_D(T \le t_{ss}) \times D_T}{[P_D(T \le t_{ss}) \times D_T + P_D(T > t_{ss}) \times D_T + P_{ND}(T > t_{ss}) \times ND_T]} \quad (4)$$

The probability of failure for the set of ICVs 162 ($P_f$) may define a probability of failure of an ICV 162 having the given set of characteristics of the set of ICVs 162. In some embodiments, determining an operational stroking frequency for the set of ICVs 162 includes determining a total ICV management cost (CMGT). The total ICV management cost (CMGT) may define an estimated total costs for maintaining, repairing and/or replacing an ICV 162 having the common characteristics, as a function of different stroking durations (or stroking frequencies). In some embodiments, determining a total ICV management cost ($C_{MGT}$) includes determining a defective ICV cost ($C_D$) (or "ICV loss and restoration cost" or "$C_{LR}$") defining a cost to repair or replace a defective ICV 162 and determining an ICV maintenance cost ($C_M$) (or "ICV preventative maintenance cost" or "$C_{PM}$") defining a cost to maintain an ICV 162 generally, or for an ICV 162 having the common set of characteristics. In some embodiments, determining a total ICV management cost ($C_{MGT}$) includes determining total ICV management cost ($C_{MGT}$) defining a cost for operating an ICV 162 as a function of stroking duration (the inverse of frequency). In some embodiments a total ICV management cost ($C_{MGT}$) is determined as follows:

$$C_{MGT} = [C_D \times P_f(T \le t_{ss}) + C_M \times R(T \le t_{ss})] \times \frac{Z}{t_{ss}} \quad (5)$$

where $R(T \le t_{ss}) = 1 - P_f(T \le t_{ss})$ and Z is a time unit conversion factor. For example, where $t_{ss}$ is expressed in months, Z may have a value of 12, to provide an annual total ICV management cost ($C_{MGT}$).

Figure 4:
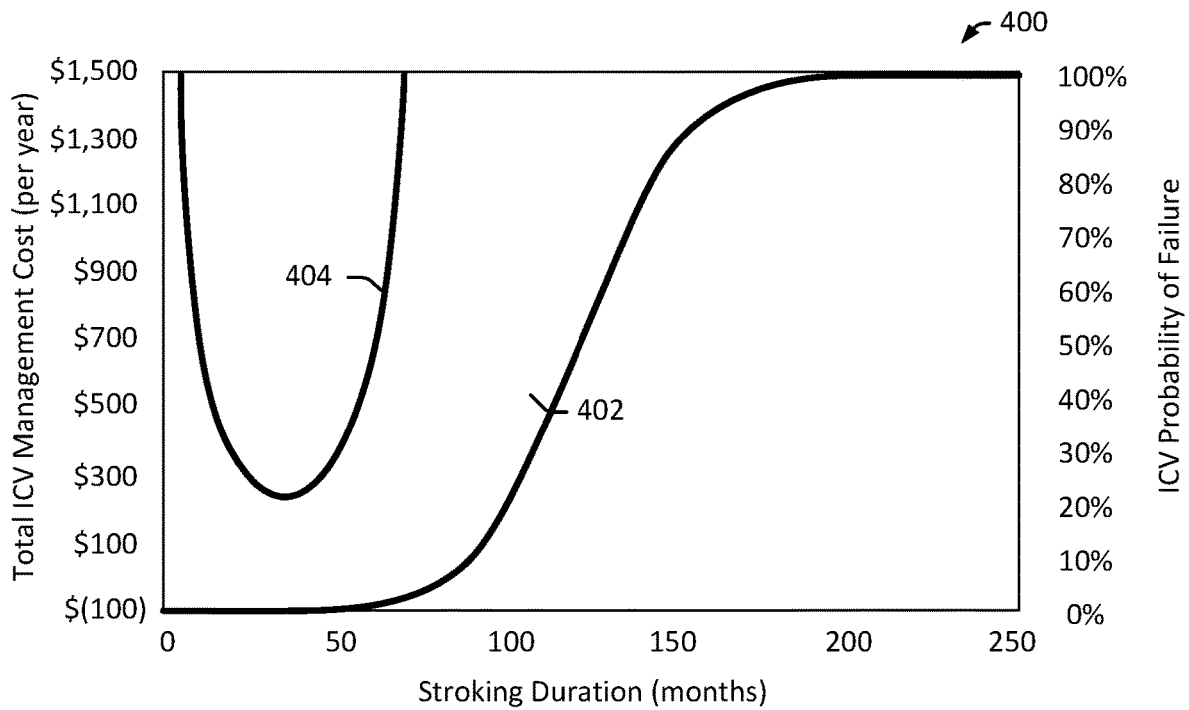
FIG. 4 is a diagram that illustrates an example decision plot, including an ICV probability of failure curve and a total ICV management cost curve, in accordance with one or more embodiments.

FIG. 4 is a diagram that illustrates an example decision plot 400 including an ICV probability of failure ($P_f$) curve 402 that corresponds to a determined probability of failure ($P_f$) and an example total ICV management cost ($C_{MGT}$) curve 404 for an ICV 162 having a given set of characteristics in accordance with one or more embodiments. The ICV probability of failure ($P_f$) curve 402 indicates that ICV failures may occur in the stroking duration range of about forty eight to about two hundred months. That is, the ICV probability of failure ($P_f$) curve 402 indicates that an ICV 162 having the given set of characteristics may be expected to fail if it is not stroked at least once every forty eight months. The total ICV management cost ($C_{MGT}$) curve 404 indicates a minimum ICV management cost of about $250 per year at a stroking duration of about thirty seven months. That is, the total ICV management cost ($C_{MGT}$) curve 404 indicates that a cost for maintaining an ICV 162 having the given set of characteristics is expected to be minimized to about $250 if the ICV 162 is stroked about every thirty seven months.

In some embodiments, determining an operational stroking frequency for the set of ICVs 162 includes determining a stroking frequency to minimize costs for maintaining and operating ICVs 162 having the common characteristics (referred to as an "economical" stroking frequency). In such an embodiment, a stroking frequency may be selected that corresponds to a minimum of the total ICV management cost ($C_{MGT}$). Referring to FIG. 4, for example, the stroking duration of about thirty seven months (a frequency of once every thirty seven months), corresponding to the minimum of the total ICV management cost ($C_{MGT}$) curve 404, may be determined as the economical stroking frequency for ICVs 162 having the common characteristics.

In some embodiments, determining an operational stroking frequency for the set of ICVs 162 includes determining a stroking frequency to minimize failures of the ICVs 162 having the common characteristics (referred to as a "performance" stroking frequency). In such an embodiment, a stroking frequency may be selected that corresponds to point where the determined probability of failure ($P_f$) is first greater than zero, or another predefined percentage (e.g., 5%). Referring to FIG. 4, for example, the stroking duration of about forty eight months (a frequency of once every forty eight months), corresponding to the point at which the probability of failure ($P_f$) curve 402 first increases from zero, may be determined as the performance stroking frequency for ICVs 162 having the common characteristics.

In some embodiments, stroking ICVs having the given set of characteristics according to the operational stroking frequency (block 206) includes stroking ICVs 162 having the common characteristics at least at the operational stroking frequency. This can include, for example, the control system 122 controlling stroking of ICVs 162 (e.g., ICVs 162 in the set of ICVs 162 and/or other ICVs 162 having the common characteristics) at a frequency that is equal to or greater than the operational stroking frequency determined for the set of ICVs 164 having the common characteristics. For example, where the operational stroking frequency is thirty seven months, an ICV 164 having the common characteristics (e.g., an ICV 162 of the same type and having similar operating conditions to the one hundred ICVs 162 of the set of ICVs 162) may be stroked one day and then be stroked again thirty seven months, or less, after the first day. Such a stroking schedule may help to flush the ICV 162 of debris to reduce the likelihood of failure of the ICV 162.

In some embodiments, the method 200 may be performed for sets of ICVs 162 with differing sets of characteristics to generate different operational stroking frequencies, and ICVs 162 can be stroked according to the operational stroking frequency corresponding to its set of characteristics. For example, if the first ICV 162a has a first set of characteristics and a first operational stroking frequency of thirty seven months is determined for ICVs 162 having the first set of characteristics, then the control system 122 may operate the first ICV 162a to stoke every thirty seven months, or sooner. If the second ICV 162b has a second set of characteristics and a second operational stroking frequency of fifty months is determined for ICVs 162 having the second set of characteristics, then the control system 122 may operate the second ICV 162a to stoke every fifty months, or sooner.

Figure 5:
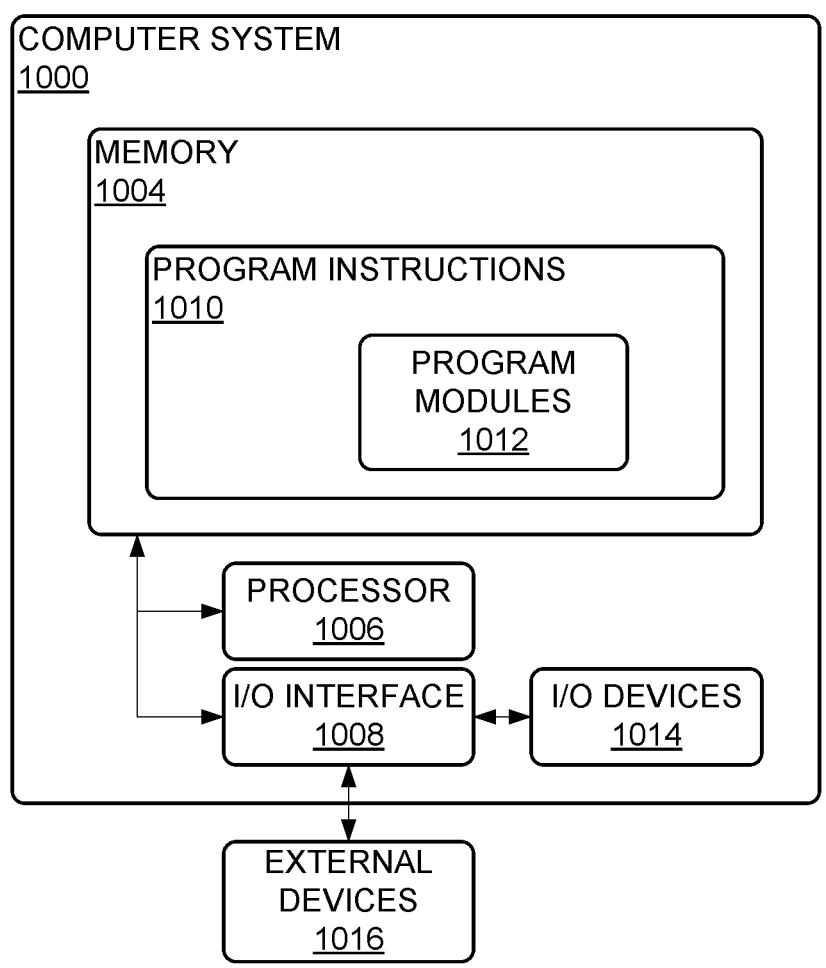
FIG. 5 is a diagram that illustrates an example computer system in accordance with one or more embodiments.

FIG. 5 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include one or more of non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), and bulk storage memory (for example, CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described, such as those described with regard to the well control system 122 and/or the method 200.

The processor 1006 may be any suitable processor capable of executing program instructions. The processor 1006 may include a central processing unit (CPU) that carries out program instructions (e.g., the program instructions of the program module(s) 1012) to perform the arithmetical, logical, and input/output operations described. The processor 1006 may include one or more processors. The I/O interface 1008 may provide an interface for communication with one or more I/O devices 1014, such as a joystick, a computer mouse, a keyboard, and a display screen (for example, an electronic display for displaying a graphical user interface (GUI)). The I/O devices 1014 may include one or more of the user input devices. The I/O devices 1014 may be connected to the I/O interface 1008 via a wired connection (e.g., an Industrial Ethernet connection) or a wireless connection (e.g., a Wi-Fi connection). The I/O interface 1008 may provide an interface for communication with one or more external devices 1016, such as sensors, valves, pumps, motors, other computers and networks. In some embodiments, the I/O interface 1008 includes one or both of an antenna and a transceiver. In some embodiments, the external devices 1016 include the ICV valves 162 and/or the completion unit 160.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method comprising:
    identifying inflow control valves (ICVs) disposed in wellbores of hydrocarbon wells and having a common set of operational characteristics, each of the ICVs of a hydrocarbon well configured to regulate the flow of production fluids from a subsurface formation into a production conduit of a wellbore of the hydrocarbon well;
    stroking each of the ICVs between an open position configured to facilitate the flow of production fluids through the ICV and a closed position configured to inhibit the flow of production fluids through the ICV;
    monitoring operation of the inflow control valves comprising:
        identifying defective ICVs comprising a first subset of the ICVs that fail to stroke properly;
        identifying non-defective ICVs comprising a second subset of the ICVs that stroke properly;
        for each of the defective ICVs, determining a failure time comprising a duration of time between a last proper stroke of the ICV and the failure of the ICV to stroke properly;
        for each of the non-defective ICVs, determining a non-failure time comprising a duration of time between last two proper strokes of the ICV;
        determining a total number of the defective ICVs ($D_T$); and
        determining a total number of the non-defective ICVs ($ND_T$);
    determining a probability of failure of the ICVs ($P_f$) comprising:
        determining a defective valve cumulative probability distribution function ($P_D(T)$) defining a portion of the defective ICVs as a function of stroking duration (T) based on the failure times for the defective ICVs and the total number of the defective ICVs ($D_T$);
        determining a non-defective valve cumulative probability distribution function ($P_{ND}(T)$) defining a portion of the non-defective ICVs as a function of stroking duration (T) based on the non-failure times for the non-defective ICVs and the total number of the non-defective ICVs ($ND_T$);
        determining a reference stroking duration ($t_{ss}$);
        determining a failure function (F) defining an expected number of failed ICVs at stroking durations (T) less than the reference stroking duration ($t_{ss}$), the failure function (F) determined as follows:

$$F = P_D(T \leq t_{ss}) \times D_T;$$

determining a survival-failure function (SF) defining an expected number of failed ICV at stroking durations (T) greater than the reference stroking duration ($t_{ss}$), the survival-failure function (SF) determined as follows:

$$SF = P_D(T > t_{ss}) \times D_T;$$

determining a survival-survival function (SS) defining an expected number of non-failed ICVs survivals for stroking durations (T) greater than the reference stroking duration ($t_{ss}$), the survival-survival function (SS) determined as follows:

$$SS = P_{ND}(T > t_{ss}) \times ND_T; \text{ and}$$

determining the probability of failure of the ICVs ($P_f$) as follows:

$$P_f = \frac{F}{F + SF + SS} = \frac{P_D(T \leq t_{ss}) \times D_T}{[P_D(T \leq t_{ss}) \times D_T + P_D(T > t_{ss}) \times D_T + P_{ND}(T > t_{ss}) \times ND_T]};$$

determining total ICV management cost ($C_{MGT}$) comprising:
        determining a defective ICV cost ($C_D$) defining a cost to repair or replace a defective ICV;
        determining an ICV maintenance cost ($C_M$) defining a cost to maintain an ICV; and
        determining total ICV management cost ($C_{MGT}$) defining a cost for operating an ICV as a function of stroking duration, total ICV management cost ($C_{MGT}$) determined as follows:

$$C_{MGT} = [C_D \times P_f(T \leq t_{ss}) + C_M \times R(T \leq t_{ss})] \times \frac{Z}{t_{ss}}$$

where $R(T \leq t_{ss}) = 1 - P_f(T \leq t_{ss})$ and Z is a time unit conversion factor;
    determining an operational stroking duration comprising a stroking duration that corresponds to a minimum of the total ICV management cost ($C_{MGT}$); and
    in response to determining the operational stroking duration, for an ICV having the common set of operational characteristics:
        stroking the ICV at a first time; and
        stroking the ICV at a second time, wherein the duration between the first time and the second time is less than or equal to the operational stroking duration.

2. The method of claim 1, further comprising:
    determining a second operational stroking duration comprising a stroking duration that corresponds to the probability of failure of the ICVs ($P_f$) being less than a predefined percentage; and
    in response to determining the second operational stroking duration, for an ICV having the common set of operational characteristics:
        stroking the ICV at third time; and
        stroking the ICV at a fourth time, wherein the duration between the third time and the fourth time is less than or equal to the second operational stroking duration.

3. The method of claim 1, wherein the predefined percentage is 0%, and the second operational stroking duration comprises the greatest stroking duration for which the probability of failure of the ICVs ($P_f$) is 0%.

4. The method of claim 1, wherein the common set of operational characteristics comprises one or more of the following: a given valve type, a given valve size, a given valve installation depth interval, a given operating temperature range, a given operating pressure range, a given operating production fluid type, a given manufacturer, and a given valve model.

5. The method of claim 1, wherein determining the reference stroking duration ($t_{ss}$) comprises selecting the reference stroking duration ($t_{ss}$) from a value between a minimum failure time identified and a maximum non-failure time identified.

6. A hydrocarbon well system comprising:
    inflow control valves (ICVs) disposed in wellbores of hydrocarbon wells and having a common set of operational characteristics, each of the ICVs of a hydrocarbon well configured to regulate the flow of production fluids from a subsurface formation into a production conduit of a wellbore of the hydrocarbon well;
    a hydrocarbon well monitoring and control system configured to perform the following operations:
        stroking each of the ICVs between an open position configured to facilitate the flow of production fluids through the ICV and a closed position configured to inhibit the flow of production fluids through the ICV;
        monitoring operation of the inflow control valves comprising:
            identifying defective ICVs comprising a first subset of the ICVs that fail to stroke properly;
            identifying non-defective ICVs comprising a second subset of the ICVs that stroke properly;
            for each of the defective ICVs, determining a failure time comprising a duration of time between a last proper stroke of the ICV and the failure of the ICV to stroke properly;
            for each of the non-defective ICVs, determining a non-failure time comprising a duration of time between last two proper strokes of the ICV;
            determining a total number of the defective ICVs ($D_T$); and
            determining a total number of the non-defective ICVs ($ND_T$);
        determining a probability of failure of the ICVs ($P_f$) comprising:
            determining a defective valve cumulative probability distribution function ($P_D(T)$) defining a portion of the defective ICVs as a function of stroking duration (T) based on the failure times for the defective ICVs and the total number of the defective ICVs ($D_T$);
            determining a non-defective valve cumulative probability distribution function ($P_{ND}(T)$) defining a portion of the non-defective ICVs as a function of stroking duration (T) based on the non-failure times for the non-defective ICVs and the total number of the non-defective ICVs ($ND_T$);
            determining a reference stroking duration ($t_{ss}$);
            determining a failure function (F) defining an expected number of failed ICVs at stroking durations (T) less than the reference stroking duration ($t_{ss}$), the failure function (F) determined as follows:

$$F = P_D(T < t_{ss}) \times D_T;$$

determining a survival-failure function (SF) defining an expected number of failed ICVs at stroking durations (T) greater than the reference stroking duration ($t_{ss}$), the survival-failure function (SF) determined as follows:

$$SF = P_D(T > t_{ss}) \times D_T;$$

determining a survival-survival function (SS) defining an expected number of non-failed ICVs survivals for stroking durations (T) greater than the reference stroking duration ($t_{ss}$), the survival-survival function (SS) determined as follows:

$$SS = P_{ND}(T > t_{ss}) \times ND_T;\text{ and}$$

determining the probability of failure of the ICVs ($P_f$) as follows:

$$P_f = \frac{F}{F + SF + SS} = \frac{P_D(T \le t_{ss}) \times D_T}{[P_D(T \le t_{ss}) \times D_T + P_D(T > t_{ss}) \times D_T + P_{ND}(T > t_{ss}) \times ND_T]};$$

determining total ICV management cost ($C_{MGT}$) comprising:
            determining a defective ICV cost ($C_D$) defining a cost to repair or replace a defective ICV;
            determining an ICV maintenance cost ($C_M$) defining a cost to maintain an ICV; and
            determining total ICV management cost ($C_{MGT}$) defining a cost for operating an ICV as a function of stroking duration, total ICV management cost ($C_{MGT}$) determined as follows:

$$C_{MGT} = [C_D \times P_f(T \le t_{ss}) + C_M \times R(T \le t_{ss})] \times \frac{Z}{t_{ss}}$$

where $R(T \le t_{ss}) = 1 - P_f(T \le t_{ss})$ and Z is a time unit conversion factor;
        determining an operational stroking duration comprising a stroking duration that corresponds to a minimum of the total ICV management cost ($C_{MGT}$); and
        in response to determining the operational stroking duration, for an ICV having the common set of operational characteristics:
            stroking the ICV at a first time; and
            stroking the ICV at a second time, wherein the duration between the first time and the second time is less than or equal to the operational stroking duration.

7. The system of claim 6, the operations further comprising:
   determining a second operational stroking duration comprising a stroking duration that corresponds to the probability of failure of the ICVs ($P_f$) being less than a predefined percentage; and
   in response to determining the second operational stroking duration, for an ICV having the common set of operational characteristics:
      stroking the ICV at third time; and
      stroking the ICV at a fourth time, wherein the duration between the third time and the fourth time is less than or equal to the second operational stroking duration.

8. The system of claim 6, wherein the predefined percentage is 0%, and the second operational stroking duration comprises the greatest stroking duration for which the probability of failure of the ICVs ($P_f$) is 0%.

9. The system of claim 6, wherein the common set of operational characteristics comprises one or more of the following: a given valve type, a given valve size, a given valve installation depth interval, a given operating temperature range, a given operating pressure range, a given operating production fluid type, a given manufacturer, and a given valve model.

10. The system of claim 6, wherein determining the reference stroking duration ($t_{ss}$) comprises selecting the reference stroking duration ($t_{ss}$) from a value between a minimum failure time identified and a maximum non-failure time identified.

11. A non-transitory computer readable medium comprising program instructions stored thereon that are executable by a processor to cause the following operations:
   identifying inflow control valves (ICVs) disposed in wellbores of hydrocarbon wells and having a common set of operational characteristics, each of the ICVs of a hydrocarbon well configured to regulate the flow of production fluids from a subsurface formation into a production conduit of a wellbore of the hydrocarbon well;
   stroking each of the ICVs between an open position configured to facilitate the flow of production fluids through the ICV and a closed position configured to inhibit the flow of production fluids through the ICV;
   monitoring operation of the inflow control valves comprising:
      identifying defective ICVs comprising a first subset of the ICVs that fail to stroke properly;
      identifying non-defective ICVs comprising a second subset of the ICVs that stroke properly;
      for each of the defective ICVs, determining a failure time comprising a duration of time between a last proper stroke of the ICV and the failure of the ICV to stroke properly;
      for each of the non-defective ICVs, determining a non-failure time comprising a duration of time between last two proper strokes of the ICV;
      determining a total number of the defective ICVs ($D_T$); and
      determining a total number of the non-defective ICVs ($ND_T$);
   determining a probability of failure of the ICVs ($P_f$) comprising:
      determining a defective valve cumulative probability distribution function ($P_D(T)$) defining a portion of the defective ICVs as a function of stroking duration (T) based on the failure times for the defective ICVs and the total number of the defective ICVs ($D_T$);
      determining a non-defective valve cumulative probability distribution function ($P_{ND}(T)$) defining a portion of the non-defective ICVs as a function of stroking duration (T) based on the non-failure times for the non-defective ICVs and the total number of the non-defective ICVs ($ND_T$);
      determining a reference stroking duration ($t_{ss}$);
      determining a failure function (F) defining an expected number of failed ICVs at stroking durations (T) less than the reference stroking duration ($t_{ss}$), the failure function (F) determined as follows:

$$F = P_D(T \le t_{ss}) \times D_T;$$

determining a survival-failure function (SF) defining an expected number of failed ICVs at stroking durations (T) greater than the reference stroking duration ($t_{ss}$), the survival-failure function (SF) determined as follows:

$$SF = P_D(T > t_{ss}) \times D_T;$$

determining a survival-survival function (SS) defining an expected number of non-failed ICVs survivals for stroking durations (T) greater than the reference stroking duration ($t_{ss}$), the survival-survival function (SS) determined as follows:

$$SS = P_{ND}(T > t_{ss}) \times ND_T;\text{ and}$$

determining the probability of failure of the ICVs ($P_f$) as follows:

$$P_f = \frac{F}{F + SF + SS} = \frac{P_D(T \le t_{ss}) \times D_T}{[P_D(T \le t_{ss}) \times D_T + P_D(T > t_{ss}) \times D_T + P_{ND}(T > t_{ss}) \times ND_T]};$$

determining total ICV management cost ($C_{MGT}$) comprising:
      determining a defective ICV cost ($C_D$) defining a cost to repair or replace a defective ICV;
      determining an ICV maintenance cost ($C_M$) defining a cost to maintain an ICV; and
      determining total ICV management cost ($C_{MGT}$) defining a cost for operating an ICV as a function of stroking duration, total ICV management cost ($C_{MGT}$) determined as follows:

$$C_{MGT} = [C_D \times P_f(T \le t_{ss}) + C_M \times R(T \le t_{ss})] \times \frac{Z}{t_{ss}}$$

where $R(T \le t_{ss}) = 1 - P_f(T \le t_{ss})$ and Z is a time unit conversion factor;
   determining an operational stroking duration comprising a stroking duration that corresponds to a minimum of the total ICV management cost ($C_{MGT}$); and
   in response to determining the operational stroking duration, for an ICV having the common set of operational characteristics:
      stroking the ICV at a first time; and
      stroking the ICV at a second time, wherein the duration between the first time and the second time is less than or equal to the operational stroking duration.

12. The medium of claim 11, the operations further comprising:
- determining a second operational stroking duration comprising a stroking duration that corresponds to the probability of failure of the ICVs ($P_f$) being less than a predefined percentage; and
- in response to determining the second operational stroking duration, for an ICV having the common set of operational characteristics:
  - stroking the ICV at third time; and
  - stroking the ICV at a fourth time, wherein the duration between the third time and the fourth time is less than or equal to the second operational stroking duration.

13. The medium of claim 11, wherein the predefined percentage is 0%, and the second operational stroking duration comprises the greatest stroking duration for which the probability of failure of the ICVs ($P_f$) is 0%.

14. The medium of claim 11, wherein the common set of operational characteristics comprises one or more of the following: a given valve type, a given valve size, a given valve installation depth interval, a given operating temperature range, a given operating pressure range, a given operating production fluid type, a given manufacturer, and a given valve model.

15. The medium of claim 11, wherein determining the reference stroking duration ($t_{ss}$) comprises selecting the reference stroking duration ($t_{ss}$) from a value between a minimum failure time identified and a maximum non-failure time identified.

16. A method comprising:
- identifying inflow control valves (ICVs) disposed in wellbores of hydrocarbon wells and having a common set of characteristics;
- stroking each of the ICVs between an open position configured to facilitate the flow of production fluids through the ICV and a closed position configured to inhibit the flow of production fluids through the ICV;
- monitoring operation of the inflow control valves comprising:
  - identifying defective ICVs comprising a first subset of the ICVs that fail to stroke properly;
  - identifying non-defective ICVs comprising a second subset of the ICVs that stroke properly;
  - for each of the defective ICVs, determining a failure time comprising a duration of time between a last proper stroke of the ICV and the failure of the ICV to stroke properly;
  - for each of the non-defective ICVs, determining a non-failure time comprising a duration of time between the last two proper strokes of the ICV;
  - determining a total number of the defective ICVs ($D_T$); and
  - determining a total number of the non-defective ICVs ($ND_T$);
- determining a probability of failure of the ICVs ($P_f$) comprising:
  - determining a defective valve cumulative probability distribution function ($P_D(T)$) defining a portion of the defective ICVs as a function of stroking duration (T) based on the failure times for the defective ICVs and the total number of the defective ICVs ($D_T$);
  - determining a non-defective valve cumulative probability distribution function ($P_{ND}(T)$) defining a portion of the non-defective ICVs as a function of stroking duration (T) based on the non-failure times for the non-defective ICVs and the total number of the non-defective ICVs ($ND_T$);
  - determining a reference stroking duration ($t_{ss}$);
  - determining a failure function (F) defining an expected number of failed ICVs at stroking durations (T) less than the reference stroking duration ($t_{ss}$);
  - determining a survival-failure function (SF) defining an expected number of failed ICV at stroking durations (T) greater than the reference stroking duration ($t_{ss}$);
  - determining a survival-survival function (SS) defining an expected number of non-failed ICVs survivals for stroking durations (T) greater than the reference stroking duration ($t_{ss}$); and
  - determining the probability of failure of the ICVs ($P_f$) based on the failure function (F), the survival failure function (SF) and the survival-survival function (SS);
- determining an operational stroking duration based on the probability of failure of the ICVs ($P_f$); and
- in response to determining the operational stroking duration, for an ICV having the common set of operational characteristics:
  - stroking the ICV at a first time; and
  - stroking the ICV at a second time, wherein the duration between the first time and the second time is less than or equal to the operational stroking duration.

17. The method of claim 16, wherein
the failure function (F) determined as follows:

$$F = P_D(T \leq t_{ss}) \times D_T$$

the survival-failure function (SF) determined as follows:

$$SF = P_D(T > t_{ss}) \times D_T$$

the survival-survival function (SS) determined as follows:

$$SS = P_{ND}(T > t_{ss}) \times ND_T, \text{ and}$$

the probability of failure of the ICVs ($P_f(T)$) determined as follows:

$$P_f = \frac{F}{F + SF + SS};$$

18. The method of claim 16, wherein determining an operational stroking duration based on the probability of failure of the ICVs ($P_f$) comprises determining a second operational stroking duration comprising a stroking duration that corresponds to the probability of failure of the ICVs ($P_f$) being less than a predefined percentage.

19. The method of claim 16, wherein determining an operational stroking duration based on the probability of failure of the ICVs ($P_f$) comprises:
- determining total ICV management cost ($C_{MGT}$) comprising:
  - determining a defective ICV cost ($C_D$) defining a cost to repair or replace a defective ICV;
  - determining an ICV maintenance cost ($C_M$) defining a cost to maintain an ICV; and
  - determining total ICV management cost ($C_{MGT}$) defining a cost for operating an ICV as a function of stroking duration, total ICV management cost ($C_{MGT}$) determined as follows:

$$C_{MGT} = [C_D \times P_f(T \leq t_{ss}) + C_M \times R(T \leq t_{ss})] \times \frac{Z}{t_{ss}},$$

where $R(T \leq t_{ss}) = 1 - P_f(T \leq t_{ss})$ and Z is a time unit conversion factor; and determining the operational stroking duration as a stroking duration that corresponds to a minimum of the total ICV management cost ($C_{MGT}$).

\* \* \* \* \*